United States Patent
Janarthanam

(10) Patent No.: US 10,162,846 B2
(45) Date of Patent: Dec. 25, 2018

(54) DATA CHANGE NOTIFICATION USING ODATA ENTITY KEYS

(71) Applicant: SuccessFactors, Inc., South San Francisco, CA (US)

(72) Inventor: Baskaran Janarthanam, Cupertino, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 409 days.

(21) Appl. No.: 14/982,479

(22) Filed: Dec. 29, 2015

(65) Prior Publication Data

US 2017/0185640 A1     Jun. 29, 2017

(51) Int. Cl.
    *G06F 17/30*     (2006.01)
    *G06F 9/54*     (2006.01)

(52) U.S. Cl.
    CPC ........ *G06F 17/30368* (2013.01); *G06F 9/542* (2013.01); *G06F 17/30575* (2013.01)

(58) Field of Classification Search
    None
    See application file for complete search history.

(56) References Cited

U.S. PATENT DOCUMENTS

| | | | | |
|---|---|---|---|---|
| 2013/0159387 | A1* | 6/2013 | James | G06F 17/30887 709/203 |
| 2015/0142781 | A1* | 5/2015 | Nigam | G06F 17/30557 707/722 |

* cited by examiner

*Primary Examiner* — Bai D Vu
(74) *Attorney, Agent, or Firm* — Schwegman Lundberg & Woessner, P.A.

(57) ABSTRACT

Systems and methods of providing data change notifications using OData entity keys are disclosed. In some example embodiments, a first modification of a first property data of a first entity of a first entity type in a relational database is detected, with the first entity having at least one first OData key distinct from the first property data. In some example embodiments, a first event notification comprising a first indication that the first property data has been modified and the at least one first OData key is generated based on an event structure model in response to the detection of the first modification of the first property data, with the first event notification being absent the modified first property data, and the first event notification is transmitted to at least one API.

18 Claims, 11 Drawing Sheets

500

```
JobInformation
{
  Key
    {
      UserID
      SeqNo
      EffectiveDate
    }
  JobTitle
  Location
  Department
}
```

```
LocationChanged
{
  Entity = JobInformation
  Keys {
        UserID = Emp100
        SeqNo = 1
        EffectiveDate = 2015-01-01
        }
}
```

```
.../JobInformation(UserID=Emp100, SeqNo=1, EffectiveDate = 2015-01-01)/$expand(Department)
```

*FIG. 7*

DATA CHANGE NOTIFICATION USING ODATA ENTITY KEYS

TECHNICAL FIELD

The present application elates generally to the technical field of data processing, and, in various embodiments, to systems and methods of providing notifications of data changes using Open Data Protocol (OData) entity keys.

BACKGROUND

When different computer systems are built at different points in time by different companies, integrating them to make them behave as a single software suite is challenging. When notifying different computer systems about changes in data, problems can arise. For example, including the actual data change in the notification can create risk in exposing such data. Additionally, the data included in the notification can be out of date and therefore an incorrect representation as to the current state of the data.

BRIEF DESCRIPTION OF THE DRAWINGS

Some example embodiments of the present disclosure are illustrated by way of example and not limitation in the figures of the accompanying drawings, in which like reference numbers indicate similar elements, and in which:

FIG. 5 illustrates pseudocode for a structure of an entity of a relational database, in accordance with some example embodiments;

FIG. 6 illustrates pseudocode for a structure of an event notification, in accordance with some example embodiments;

FIG. 7 illustrates pseudocode for a structure of a request for property data, in accordance with some example embodiments;

DETAILED DESCRIPTION

Figure 1:
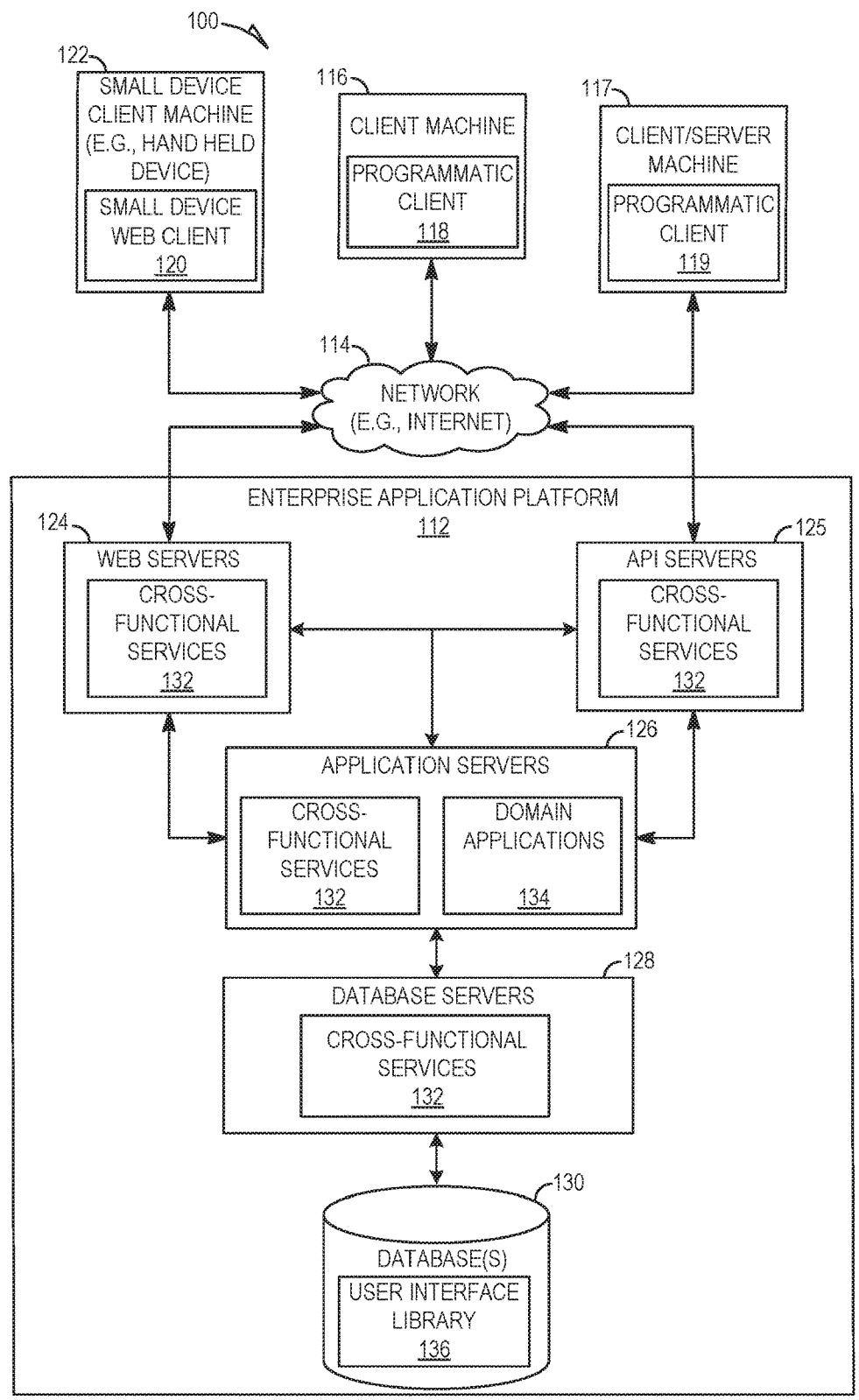
FIG. 1 is a network diagram illustrating a client-server system, in accordance with some example embodiments.

Example methods and systems of providing notifications of data changes using Open Data Protocol (OData) entity keys are disclosed. In the following description, for purposes of explanation, numerous specific details are set forth in order to provide a thorough understanding of example embodiments. It will be evident, however, to one skilled in the art that the present embodiments can be practiced without these specific details.

In some implementations, methods and apparatus, including computer program products, are provided for generating and providing notifications of data changes using OData entity keys.

In some example embodiments, at least one processor performs operations comprising detecting a first modification of a first property data of a first entity of a first entity type in a relational database is detected, with the first entity having at least one first OData key distinct from the first property data, generating a first event notification comprising a first indication that the first property data has been modified and the at least one first OData key based on an event structure model in response to the detection of the first modification of the first property data, with the first event notification being absent the modified first property data, and transmitting the first event notification to at least one application programming interface (API).

The above methods, apparatus, and computer program products may, in some implementations, further include one or more of the following features.

In some example embodiments, the processor(s) receives a request for the modified first property data is received from one of the at least one API, with the request comprising the at least one first OData key, retrieves the modified first property data based on the at least one first OData key in response to the request, and transmits the retrieved modified first property data to the at least one API.

In some example embodiments, the first entity comprises a navigation property link linking the first entity to a second entity of a second entity type, with the second entity comprising a second property data absent from the first entity, and the processor(s) receives a request for the second property data from one of the at least one API, with the request comprising the at least one first OData key, retrieves the second property data based on the at least one first OData key and the navigation property link in response to the request, and transmits the retrieved second property data to the at least one API.

In some example embodiments, the first entity comprises a navigation property link linking the first entity to a second entity of a second entity type, with the second entity comprising a second property data absent from the first entity, and the processor(s) detects a second modification of the second property data of the second entity, with the second entity having at least one second OData key distinct from the second property data, generates a second event notification comprising a second indication that the second property data has been modified and the at least one second OData key based on the event structure model in response to the detection of the second modification of the second property data, with the second event notification being absent the modified second property data, and transmits the second event notification to the at least one API. In some example embodiments, the processor(s) receives a request for the modified second property data from one of the at least one API, with the request comprising the at least one second OData key, retrieves the modified second property data based on the at least one second OData key in response to the request, and transmits the retrieved modified second property data to the at least one API.

In some example embodiments, the processor(s) receives a request from one of the at least one API (or from at least on Web service), with the request comprising the at least one first OData key, and can retrieve data from the first entity and/or any entities related to the first entity to any desirable depth from a single callback. In some example embodiments, the processor(s) receives a request from one of the at least one API, with the request comprising the at least one first OData key, retrieves property data of the first entity and/or one or more other entities related to the first entity based on the at least one first OData key in response to the request, and transmits the retrieved property data to the at least one API.

In some example embodiments, the processor(s) receives a request from one of the at least one API, the request comprising the at least one first OData key, and retrieves, in response to the request, all property data of the first entity and all property data of entities related to the first entity based on the at least one first OData key and a corresponding navigation property link, for each one of the entities related to the first entity, linking the first entity to the corresponding entity related to the first entity. In some example embodiments, the processor(s) transmit the retrieved property data of the first entity and the retrieved property data of entities related to the first entity to the at least one API.

In some example embodiments, the at least one API comprises a plurality of APIs, with each one of the plurality of APIs corresponding to a different Web service. In some example embodiments, the at least one API comprises at least one OData API of a Web service.

The methods or embodiments disclosed herein may be implemented as a computer system having one or more modules (e.g., hardware modules or software modules). Such modules may be executed by one or more processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
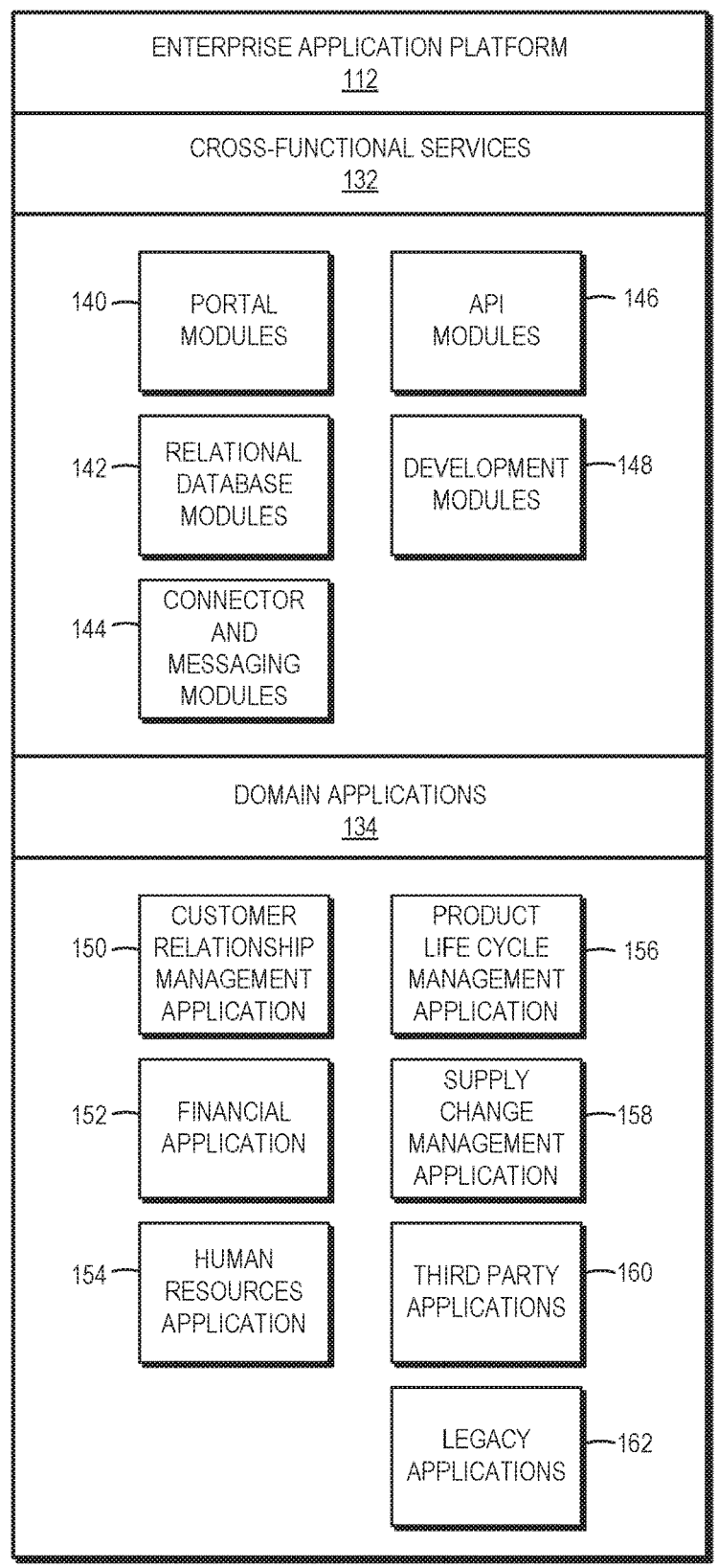
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
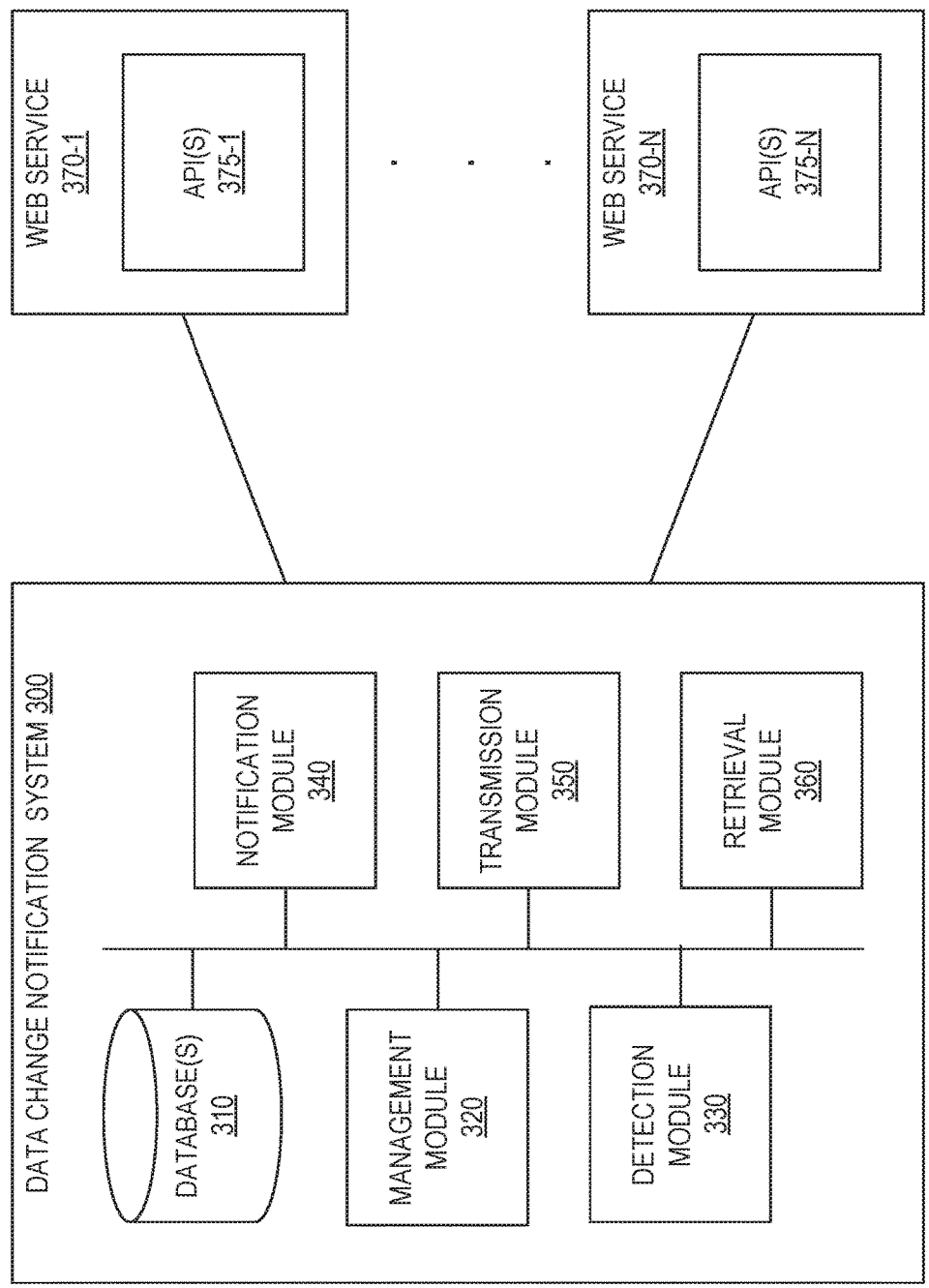
FIG. 3 is a block diagram illustrating a data change notification system, in accordance with some example embodiments.

FIG. 3 is a block diagram illustrating a data change notification system 300, in accordance with some example embodiments. In some example embodiments, the data change notification system 300 comprises any combination of one or more of one or more databases 310, management module 320, a detection module 330, a notification module 340, a transmission module 350, and a retrieval module 360.

In some example embodiments, the database(s) 310 and the modules 320, 330, 340, 350, and 360 reside on a machine having a memory and at least one processor (not shown). In some example embodiments, the database(s) 310 and the modules 320, 330, 340, 350, and 360 reside on the same machine, while in other example embodiments, one or more of database(s) 310 and the modules 320, 330, 340, 350, and 360 reside on separate remote machines that communicate with each other via a network (e.g., network 114 in FIG. 1). In some example embodiments, the database(s) 310 and the modules 320, 330, 340, 350, and 360 can be incorporated into the enterprise application platform 112 in FIG. 1 (e.g., on application server(s) 126). However, it is contemplated that other configurations are also within the scope of the present disclosure.

In some example embodiments, the database(s) 310 comprises one or more relational databases storing one or more entities. In some example embodiments, the entities comprise OData entities. Each entity is an instance of an entity type comprising one or more properties, and can include relationships with other entities. Relationships can be used to navigate from an entity to related entities. Each property can comprise corresponding property data. In some example embodiments, one or more of the property data of an entity comprise an OData key. It is contemplated that a single entity can comprise multiple keys or can comprise a single key formed from one or more property data.

Figure 4:
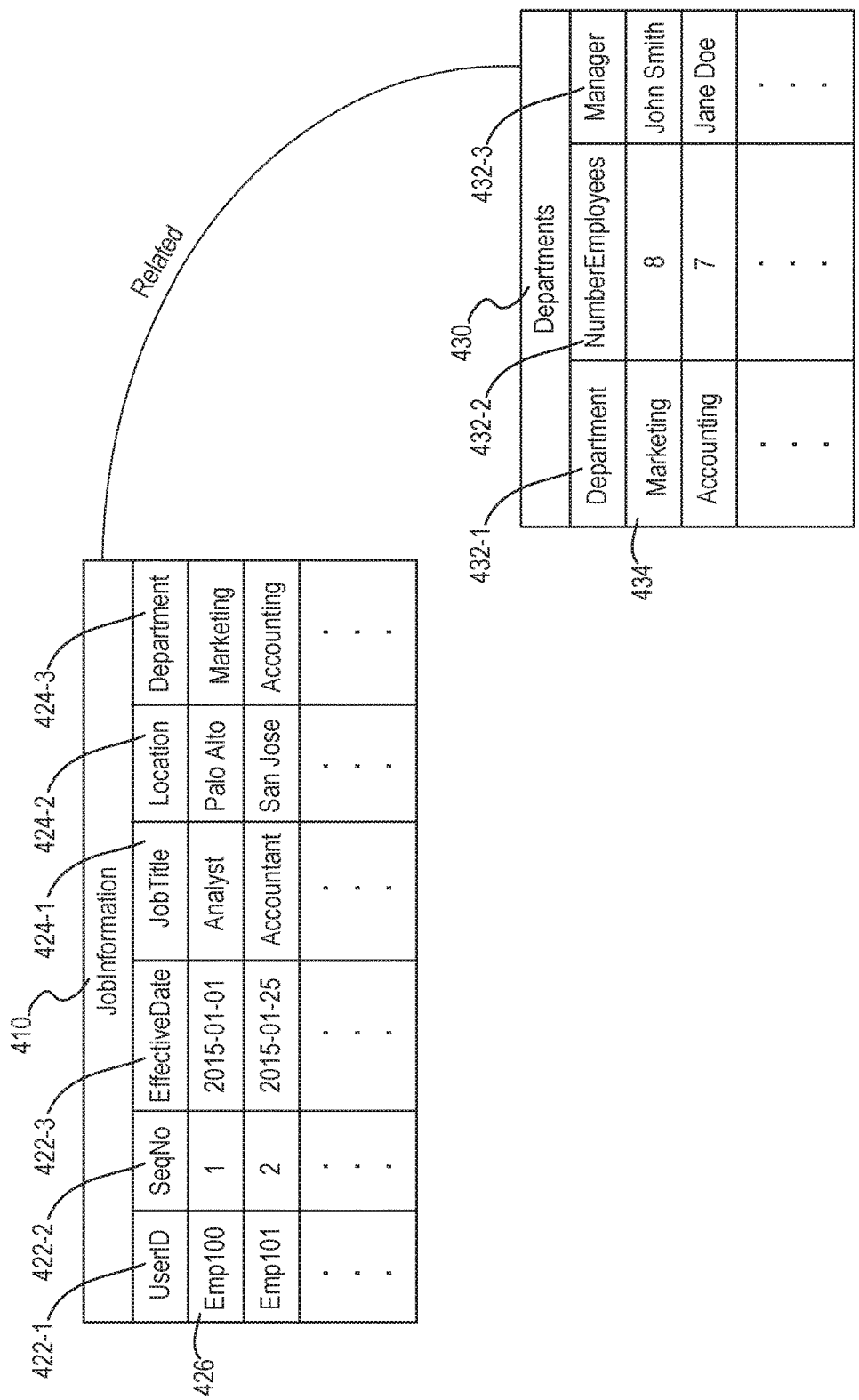
FIG. 4 illustrates two related entities of a relational database, in accordance with some example embodiments.

FIG. 4 illustrates two related entities 410 and 430 of a relational database, in accordance with some example embodiments. Entity 410 is an instance of entity type JobInformation, while entity 430 is an instance of entity type Departments. The Job information entity 410 comprises properties 422-1 (UserID), 422-2 (SeqNo), 422-3 (EffectiveDate) and properties 424-1 (JobTitle), 424-2 (Location), 424-3 (Department each having corresponding property data 426. For example, the corresponding property data 426 of property 422-1 comprises an identification of a user (e.g., Emp100, Emp101, . . . ), the corresponding property data 426 of property 422-2 comprises sequence number (e.g., 1, 2, . . . ), the corresponding property data 426 of property 422-3 comprises an identification of an effective date of the other property data in the same row (e.g., 2015-01-01, 2015-01-25, . . . ), the corresponding property data 426 of property 424-1 comprises an identification of a user's job title (e.g., Analyst, Accountant, . . . ), the corresponding property data 426 of property 424-2 comprises an identification of a location of a user (e.g., Palo Alto, San Jose, . . . ), and the corresponding property data 426 of property 424-3 comprises an identification of a department of a user (e.g., Marketing, Accounting, . . . ).

In the example shown in FIG. 4, properties 422-1, 422-2, 422-3 form an OData key that can be used to find associated data. For example, the OData key formed from properties 422-1, 422-2, and 422-3 can be used to find any of the other property data 426 of the entity 410, such as any combination of one or more of the job title, location, and department of employee "Emp100" having sequence number "1" as of the effective date of "2015-01-01."

In the example shown in FIG. 4, entity 410 is related to entity 430. The entity 410 and the entity 430 each comprise a navigation property link that links them to each other. As shown in FIG. 4, the Departments entity 430 comprises properties 432-1 (Department), 432-2 (NumberEmployees), 432-3 (Manager), each having corresponding property data 434. For example, the corresponding property data 434 of property 432-1 comprises an identification of a department (e.g., Marketing, Accounting, . . . ), the corresponding property data 434 of property 432-2 comprises a number of employees in the corresponding department (e.g., 8, 7, . . . ), and the corresponding property data 434 of property 432-3 comprises an identification of a manager of the corresponding department (e.g., John Smith, Jane Doe, . . . ).

FIG. 5 illustrates pseudocode 500 for a structure of entity 410 of a relational database, in accordance with some example embodiments. As seen in FIG. 5, the structure of entity 410 can identify the property data (e.g., UserID, SeqNo, EffectiveDate) that forms a key, such as an OData key, of the entity. It is contemplated that other configurations are also within the scope of the present disclosure.

Referring back to FIG. 3, one or more Web services 370 (e.g., Web service 370-1, Web service 370-2, . . . , Web service 370-N) are communicatively coupled to the data change notification system 300 or to any combination of one or more of its modules via a network connection. Web service(s) 370 may comprise any software system designed to support interoperable machine-to-machine interaction over a network. In some example embodiments, Web service (s) 370 may comprise one or more representational state transfer (REST)-compliant Web services, in which the primary purpose of the service is to manipulate representations of Web resources using a uniform set of stateless operations. However, other configurations are within the scope of the present disclosure. Each Web service 370 may comprise one or more APIs 375 (API 375-1, API 375-2, . . . , API 375-N) through which the Web service 370 consumes data from the database(s) 310. In some example embodiments, the API(s) 375 comprises at least one OData API of a Web service 370. The Web service(s) 370 and API(s) 375 may be internal or external to the same system that encompasses the data change notification system 300.

Although reference is made herein to Web services 370 and APIs 375, it is contemplated that the data change notification system 300 can communicate (e.g., transmit event notifications and property data, receive requests) with other type of computing devices as well.

In some example embodiments, the management module 320 is configured to create, update (e.g., change or modify), and manage data in the database(s) 310. For example, for the JobInformation entity 410 in FIG. 4, the management module 320 can change the corresponding job title, location, and/or department of "Emp100" based on a request or instruction from a human user or based on an automatic request or instruction from a programmatic user.

In some example embodiments, the detection module 330 is configured to detect any modifications to any property data of any entities of any entity type in the database(s) 310. For example, if the location of Emp100 of entity 410 in FIG. 4 is changed from Palo Alto to San Francisco, then the detection module 330 can detect this change.

In some example embodiments, the notification module 340 is configured to generate an event notification based on an event structure model in response to the detection by the detection module 330 of a modification of property data. The event notification comprises an indication that the property data has been modified and at least one OData key of the corresponding entity of the property data modification. In some example embodiments, the event notification is absent the modified property data. By omitting the modified property data from the event notification and including an OData key instead, the notification module 340 resolves the data security issues of the prior art, since only systems that have authorization to view the data of the database(s) 310 can access and view the modified property data, as a callback from the endpoint Web service is employed to obtain the modified property data.

In some example embodiments, the notification module 340 is configured to use the same event structure model for generating event notifications, regardless of what type of property data was modified or to which destination Web service(s) 370 or destination API(s) 375 the event notification is being transmitted. This use of a single generic event structure model for generating event notifications provides a unified standard for defining outbound events and enables flexible accommodation of a variety of different Web services 370 and APIs 375.

FIG. 6 illustrates pseudocode 600 for a structure of an event notification, in accordance with some example embodiments. As seen in FIG. 6, the structure of the event notification can provide an indication that property data has changed (e.g., "LocationChanged") for a particular entity (e.g., "Entity=JobInformation"), as well as include at least one OData key (e.g., "UserID=Emp100," "SeqNo=1," "EffectiveDate=2015-01-01") of the corresponding entity of the property data modification. It is contemplated that other configurations are also within the scope of the present disclosure.

In some example embodiments, the transmission module 350 is configured to transmit the generated event notifications to at least one Web service 370. In some example embodiments, the transmission module 350 is configured to transmit the generated event notifications to at least one API 375. It is contemplated that other configurations are also within the scope of the present disclosure.

In some example embodiments, the retrieval module 360 is configured to receive, from one or more APIs 375, a request for property data. The request comprises at least one OData key. FIG. 7 illustrates pseudocode 700 for a structure of a request for property data, in accordance with some example embodiments. As seen in FIG. 7, the structure of the request can include an identification of an entity (e.g., "JobInformation"), as well as at least one OData key (e.g., "UserID=Emp100," "SeqNo=1" "EffectiveDate=2015-01-01"). It is contemplated that other configurations are also within the scope of the present disclosure.

In some example embodiments, the API 370 is configured to automatically generate and transmit the request in response to receiving the event notification. For example the API 370 can received the event notification, automatically generate a request based on OData key(s) included in the received event notification, and automatically transmit the generated request to the retrieval module 360.

In some example embodiments, the request includes an indication of what property data is to be retrieved. However, in some example embodiments, the request does not specify what property data is to be retrieved, and the retrieval module 360 determines what property data is to be retrieved, such as based on a preconfigured setting or categorization of the Web service 370 that issued the request. For example, the retrieval module 360 can determine that the Web service 370 from which the request was received has a corresponding preconfigured setting to receive a particular set of property data. In another example, the retrieval module 360 can determine that the Web service 370 from which the request was received is of a particular category and therefore should receive a particular set of property data. It is contemplated that other configurations are also within the scope of the present disclosure.

In some example embodiments, the request comprises a request for property data of a specific entity. For example, the request can comprise a request for property data of entity 410.

In some example embodiments, the request comprises a request for all property data of a specific entity. For example, the request can comprise a request for all property data of entity 410.

In some example embodiments, the request comprises a request for specific property data of a specific entity. For example, the request can comprise a request for the JobTitle property data and the Location property data corresponding to the key (UserID)=Emp100, SeqNo=1, EffectiveDate=2015-01-01).

In some example embodiments, the request comprises a request for all modified property data of a specific entity. For example, the request can comprise a request for all modified property data of entity 410.

In some example embodiments, the request comprises a request for all property data of a specific entity and all property data of all entities that are related to that specific entity. For example, the request can comprise a request for all property data of entity 410 and all property data of any entities related to entity 410 (e.g., all property data of entity 430 in FIG. 4).

In some example embodiments, when retrieving property data of a related entity (e.g., an entity related to the entity of the modified property data), the retrieval module 360 is configured to also use the corresponding navigation property link that links the related entity to the entity of the modified property data.

In some example embodiments, the retrieval module 360 is configured to retrieve property data based on the OData key(s) included in the request. In some example embodiments, the retrieval module 360 retrieves the property data of a specific entity (e.g., the entity of the modified property data or a related entity). For example, the retrieval module 360 can retrieve the property data of entity 410 using the OData key(s) or the property data of entity 430 using the OData key(s) and a navigation property link.

In some example embodiments, the retrieval module 360 retrieves all property data of a specific entity (e.g., the entity of the modified property data or a related entity). For example, the retrieval module 360 can retrieve all the property data of entity 410 using the OData key(s) or all the property data of entity 430 using the OData key(s) and a navigation property link.

In some example embodiments, the retrieval module 360 retrieves specific property data of a specific entity (e.g., the entity of the modified property data or a related entity). For example, the retrieval module 360 can retrieve only the JobTitle and Location property data corresponding to the key (UserID=Emp100, SeqNo=1, EffectiveDate=2015-01-01) in entity 410 using the OData key(s) or only the Manager property data of property data corresponding to the Marketing department in entity 430 using the OData key(s) and a navigation property link.

In some example embodiments, the retrieval module 360 retrieves all modified property data of a specific entity (e.g., the entity of the modified property data or a related entity). For example, the retrieval module 360 can retrieve all the modified property data of entity 410 using the OData key(s) or all the modified property data of related entity 430 using the OData key(s) and a navigation property link.

In some example embodiments, the retrieval module 360 retrieves all property data of a specific entity and all property data of all entities that are related to that specific entity. For example, the retrieval module 360 can retrieve all property data of entity 410 using the OData key(s) and all property data of related entity 430 using the OData key(s) and a navigation property link.

In some example embodiments, the transmission module 350 is configured to transmit the retrieved property data to the requesting Web service 370 (e.g., to its corresponding API(s) 375) for use in a corresponding service of the requesting Web service 370.

Figure 8:
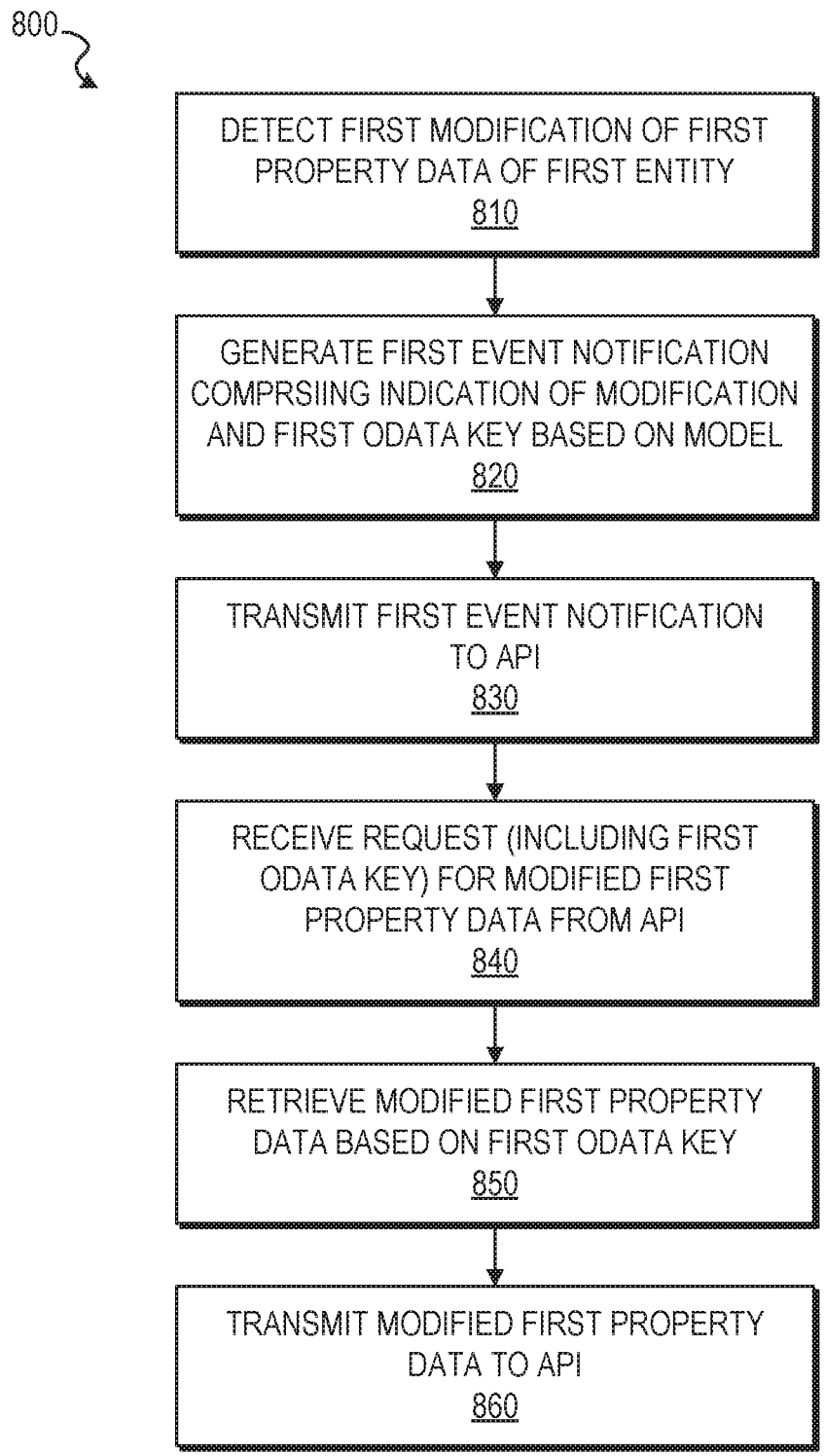
FIG. 8 is a flowchart illustrating a method of data change notification, in accordance with some example embodiments.

FIG. 8 is a flowchart illustrating a method 800 of data change notification, in accordance with some example embodiments. Method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the data change notification system 300 of FIG. 3, or any combination of one or more of its components or modules, as described above.

At operation 810, the detection module 330 detects a first modification of a first property data of a first entity of a first entity type in a relational database, with the first entity having at least one first OData key distinct from the first property data. At operation 820, the notification module 340 generates a first event notification comprising a first indication that the first property data has been modified and the at least one first OData key based on an event structure model in response to the detection of the first modification of the first property data, with the first event notification being absent the modified first property data. At operation 830, the transmission module 350 transmits the first event notification to at least one API. At operation 840, the retrieval module 360 receives a request for the modified first property data from one of the at least one API, with the request comprising the at least one first OData key. At operation 850, the retrieval module 360 retrieves the modified first property data based on the at least one first OData key in response to the request. At operation 860, the transmission module 350 transmits the retrieved modified first property data to the at least one API.

It is contemplated that any of the other features described within the present disclosure can be incorporated into method 800.

Figure 9:
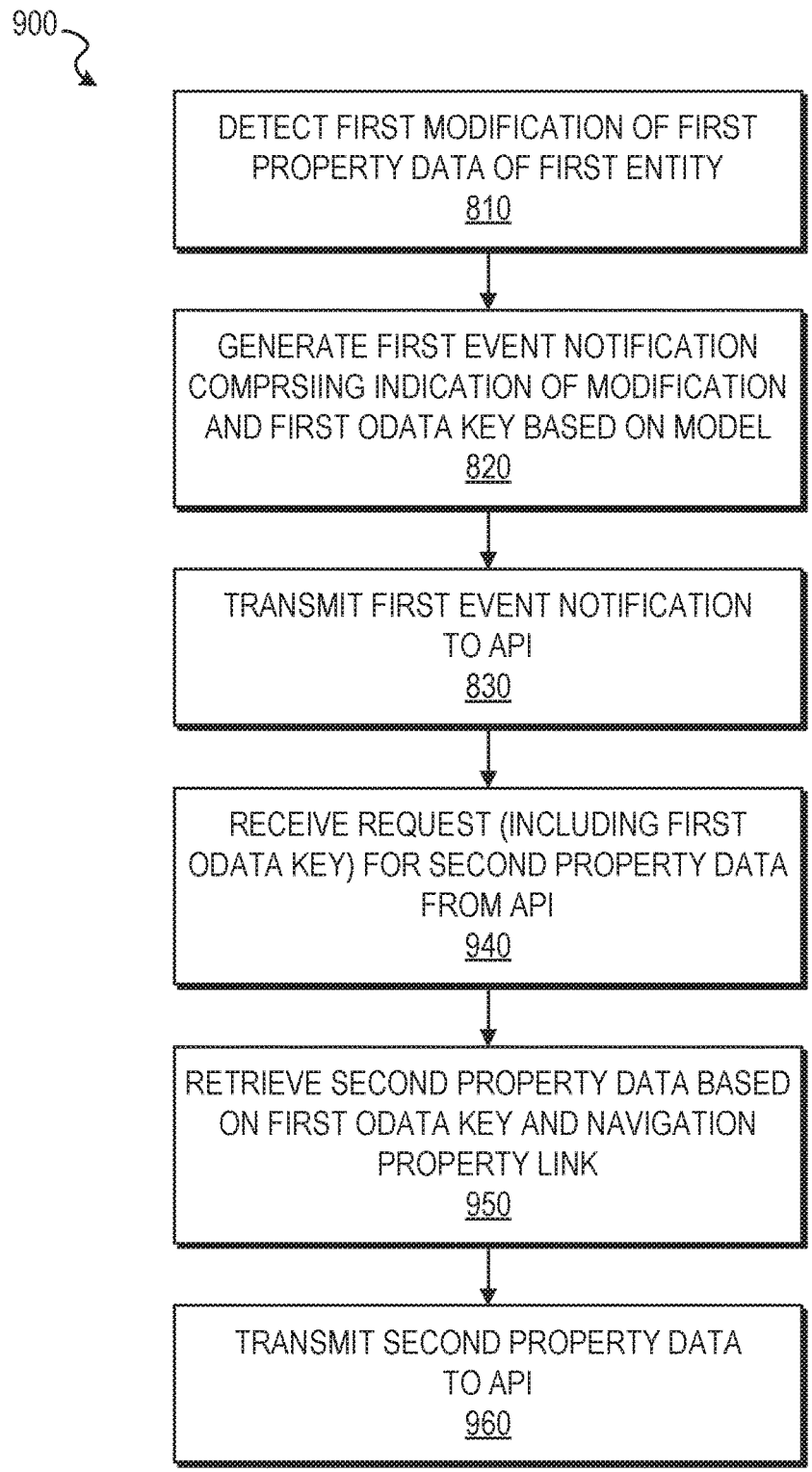
FIG. 9 is a flowchart illustrating another method of providing data change notification, in accordance with some example embodiments.

FIG. 9 is a flowchart illustrating another method 900 of providing data change notification, in accordance with some example embodiments. Method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by the data change notification system 300 of FIG. 3, or any combination of one or more of its components or modules, as described above.

At operation 810, the detection module 330 detects a first modification of a first property data of a first entity of a first entity type in a relational database, with the first entity having at least one first OData key distinct from the first property data. At operation 820, the notification module 340 generates a first event notification comprising a first indication that the first property data has been modified and the at least one first OData key based on an event structure model in response to the detection of the first modification of the first property data, with the first event notification being absent the modified first property data. At operation 830, the transmission module 350 transmits the first event notification to at least one API.

In some example embodiments, the first entity comprises a navigation property linking the first entity to a second entity of a second entity type, with the second entity comprising a second property data absent from the first entity. At operation 940, the retrieval module 360 receives a request for the second property data from one of the at least one API, with the request comprising the at least one first OData key. At operation 950, the retrieval module 360 retrieves the second property data based on the at least one first OData key and the navigation property link in response to the request. At operation 960, the transmission module 350 transmits the retrieved second property data to the at least one API.

It is contemplated that any of the other features described within the present disclosure can be incorporated into method 900.

Figure 10:
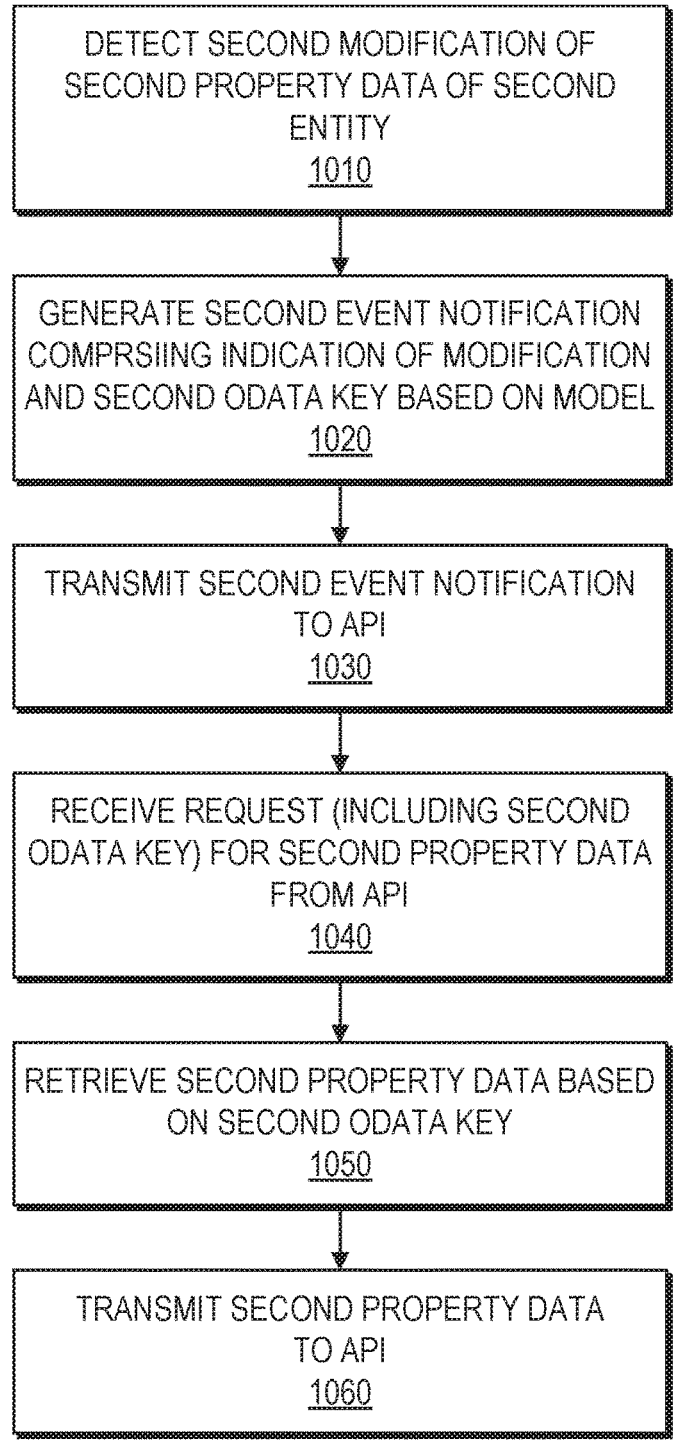
FIG. 10 is a flowchart illustrating yet another method of providing data change notification, in accordance with some example embodiments.

FIG. 10 is a flowchart illustrating yet another method 1000 of providing data change notification, in accordance with some example embodiments. Method 1000 can be performed by processing logic that can comprise hardware (e.g., circuitry, dedicated logic, programmable logic, microcode, etc.), software (e.g., instructions run on a processing device), or a combination thereof. In one example embodiment, the method 1000 is performed by the data change notification system 300 of FIG. 3, or any combination of one or more of its components or modules, as described above.

In some example embodiments, the first entity comprises a navigation property link linking the first entity to a second entity of a second entity type, with the second entity comprising a second property data absent from the first entity.

At operation 1010, the detection module 330 detects a second modification of the second property data of the second entity, with the second entity having at least one second OData key distinct from the second property data. At operation 1020, the notification module 340 generates a second event notification comprising a second indication that the second property data has been modified and the at least one second OData key based on the event structure model in response to the detection of the second modification of the second property data, with the second event notification being absent the modified second property data. At operation 1030, the transmission module 350 transmits the second event notification to the at least one API. At operation 1040, the retrieval module 360 receives a request for the modified second property data from one of the at least one API, with the request comprising the at least one second OData key. At operation 1050, the retrieval module 360 retrieves the modified second property data based on the at least one second OData key in response to the request. At operation 1060, the transmission module 350 transmits the retrieved modified second property data to the at least one API.

It is contemplated that any of the other features described within the present disclosure can be incorporated into method 1000.

Figure 11:
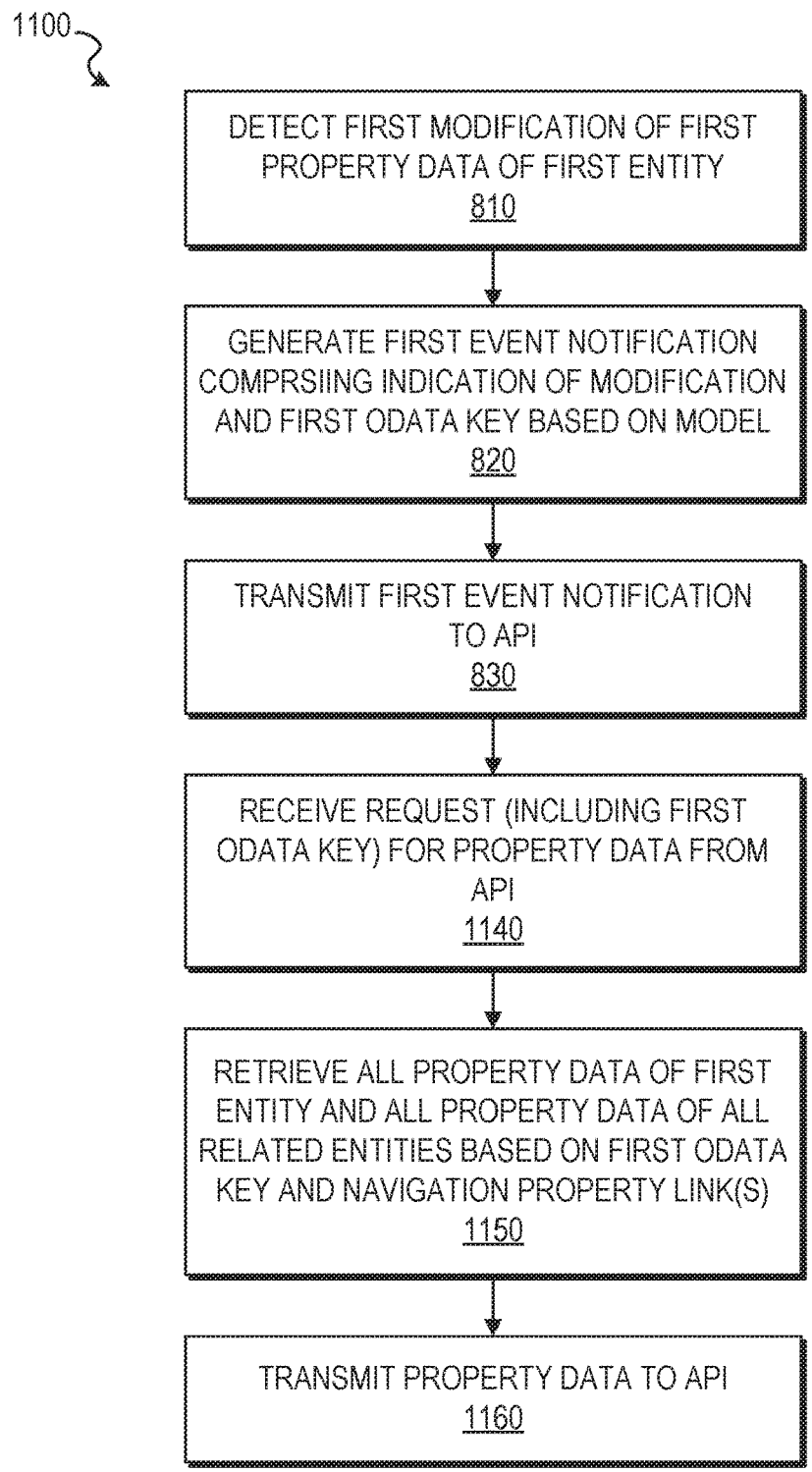
FIG. 11 is a flowchart illustrating yet another method of providing data change notification, in accordance with some example embodiments.

FIG. 11 is a flowchart illustrating yet another method of providing data change notification, in accordance with some example embodiments. Method 1100 can be performed by processing logic that can comprise hardware (e.g., circuitry, dedicated logic, programmable logic, microcode, etc.), software (e.g., instructions run on a processing device), or a combination thereof. In one example embodiment, the method 1100 is performed by the data change notification system 300 of FIG. 3, or any combination of one or more of its components or modules, as described above.

At operation 810, the detection module 330 detects a first modification of a first property data of a first entity of a first entity type in a relational database, with the first entity having at least one first OData key distinct from the first property data. At operation 820, the notification module 340 generates a first event notification comprising a first indication that the first property data has been modified and the at least one first OData key based on an event structure model in response to the detection of the first modification of the first property data, with the first event notification being absent the modified first property data. At operation 830, the transmission module 350 transmits the first event notification to at least one API.

At operation 1140, the retrieval module 360 receives a request from one of the at least one API, the request comprising the at least one first OData key. At operation 1150, the retrieval module 360 retrieves, in response to the request, all property data of the first entity and all property data of entities related to the first entity based on the at least one first OData key and a corresponding navigation property link, for each one of the entities related to the first entity, linking the first entity to corresponding entity related to the first entity. At operation 1160, the transmission module 350 transmits the retrieved property data of the first entity and the retrieved property data of entities related to the first entity to the at least one API.

It is contemplated that any of the other features described within the present disclosure can be incorporated into method 1100.

It is contemplated that any features of any embodiments disclosed herein can be combined with any other features of any other embodiments disclosed herein. Accordingly, these any such hybrid embodiments are within the scope of the present disclosure.

Figure 12:
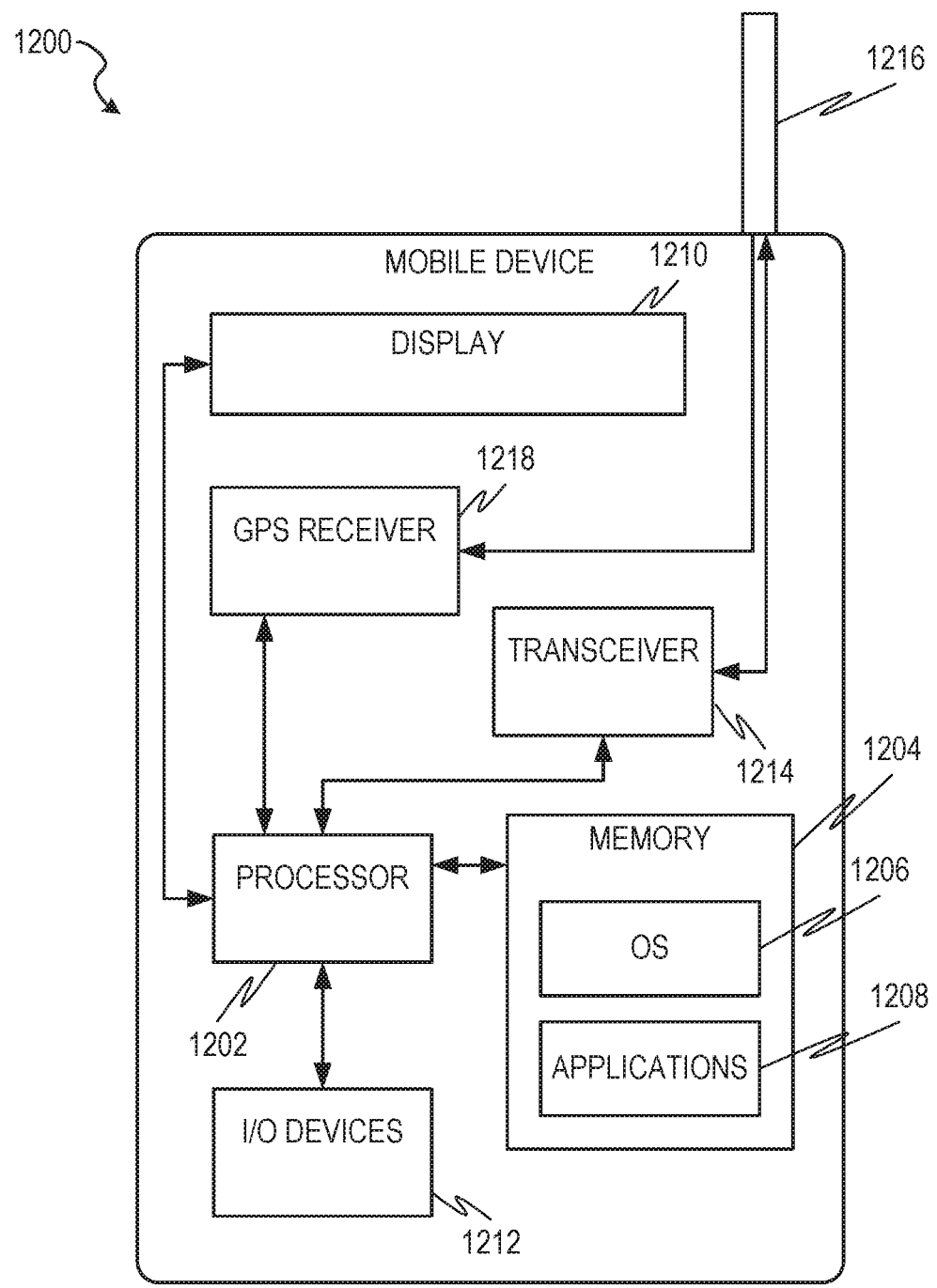
FIG. 12 is a block diagram illustrating a mobile device, in accordance with some example embodiments.

FIG. 12 is a block diagram illustrating a mobile device 1200, in accordance with some example embodiments. The mobile device 1200 can include a processor 1202. The processor 1202 can be any of a variety of different types of commercially available processors suitable for mobile devices 1200 (for example, an XScale architecture microprocessor, a Microprocessor without Interlocked Pipeline Stages (MIPS) architecture processor, or another type of processor). A memory 1204, such as a random access memory (RAM), a Flash memory, or other type of memory, is typically accessible to the processor 1202. The memory 1204 can be adapted to store an operating system (OS) 1206, as well as application programs 1208, such as a mobile location enabled application that can provide LBSs to a user. The processor 1202 can be coupled, either directly or via appropriate intermediary hardware, to a display 1210 and to one or more input/output (I/O) devices 1212, such as a keypad, a touch panel sensor, a microphone, and the like. Similarly, in some example embodiments, the processor 1202 can be coupled to a transceiver 1214 that interfaces with an antenna 1216. The transceiver 1214 can be configured to both transmit and receive cellular network signals, wireless data signals, or other types of signals via the antenna 1216, depending on the nature of the mobile device 1200. Further, in some configurations, a GPS receiver 1218 can also make use of the antenna 1216 to receive GPS signals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 13:
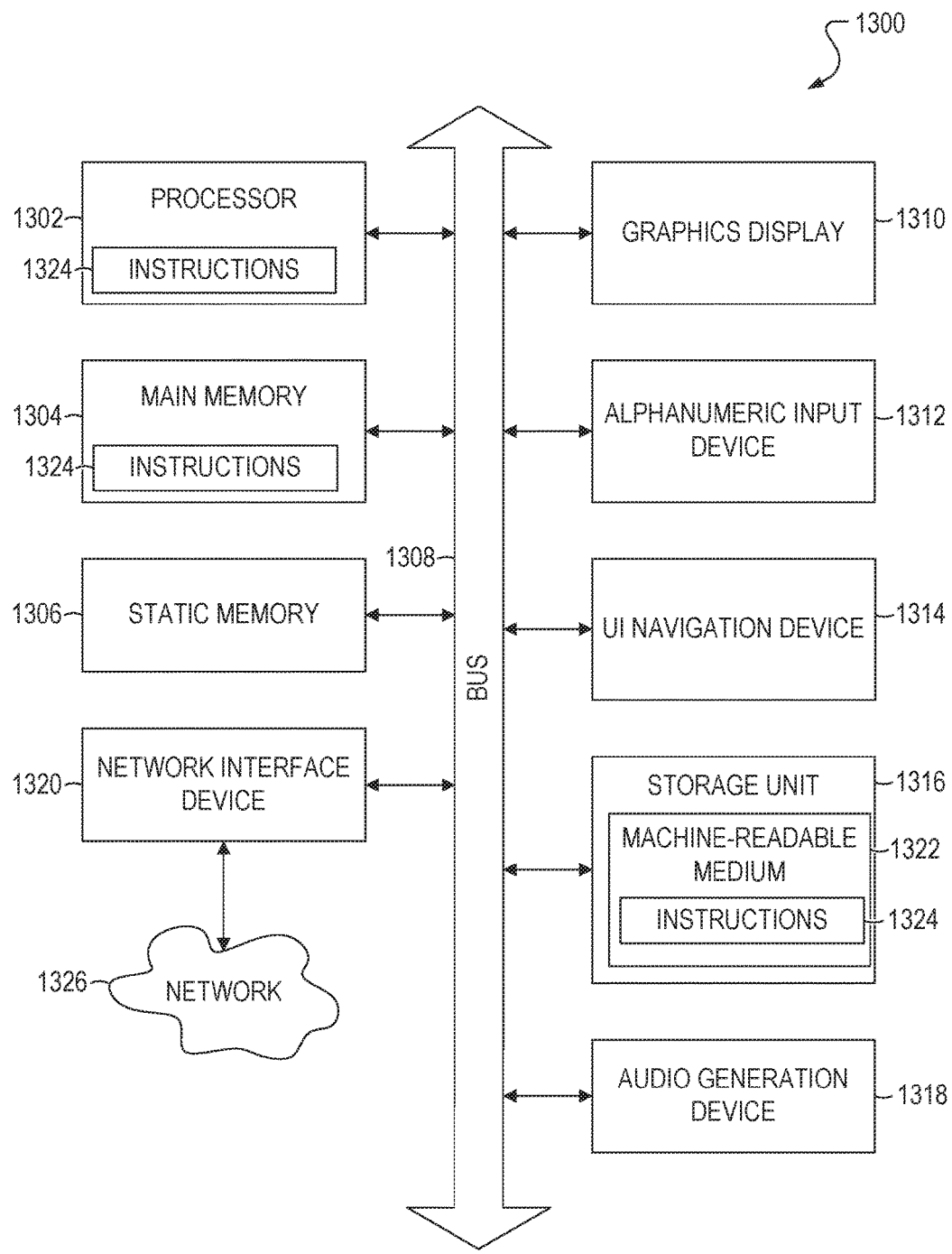
FIG. 13 is a block diagram of an example computer system on which methodologies described herein can be executed, in accordance with some example embodiments.

FIG. 13 is a block diagram of a machine in the example form of a computer system 1300 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (SIB), a Personal Digital Assistant (PDA), a cellular telephone, a web appliance, a network router, switch or bridge; or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a graphics or video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a storage unit (e.g., a disk drive unit) 1316, an audio or signal generation device 1318 (e.g., a speaker), and a network interface device 1320.

The storage unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for selective gesture interaction using spatial volumes. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one processor; and
   a non-transitory computer-readable medium storing executable instructions that, when executed, cause the at least one processor to perform operations comprising:
   detecting a first modification of a first property data of a first entity of a first entity type in a relational database, the first entity having at least one first Open Data Protocol (OData) key comprising first other property data of the first entity distinct from the first property data, the first entity comprising a navigation property link linking the first entity to a second entity of a second entity type, the second entity comprising a second property data absent from the first entity;
   generating, in response to the detection of the first modification of the first property data, a first event notification comprising a first indication that the first property data has been modified and the at least one first OData key based on an event structure model, the first event notification being absent the modified first property data;
   transmitting the first event notification to at least one application programming interface (API);
   detecting a second modification of the second property data of the second entity, the second entity having at least one second OData key comprising second other property data of the second entity distinct from the second property data;
   generating, in response to the detection of the second modification of the second property data, a second event notification comprising a second indication that the second property data has been modified and the at least one second OData key based on the event structure model, the second event notification being absent the modified second property data; and
   transmitting the second event notification to the at least one API.

2. The system of claim 1, wherein the operations further comprise:
   receiving a request for the modified first property data from one of the at least one API, the request comprising the at least one first OData key;
   retrieving the modified first property data based on the at least one first OData key in response to the request; and
   transmitting the retrieved modified first property data to the at least one API.

3. The system of claim 1, wherein the first entity comprises a navigation property link linking the first entity to a second entity of a second entity type, the second entity comprising a second property data absent from the first entity, and the operations further comprising:
   receiving a request for the second property data from one of the at least one API, the request comprising the at least one first OData key;

retrieving, in response to the request, the second property data based on the at least one first OData key and the navigation property link; and transmitting the retrieved second property data to the at least one API.

4. The system of claim 1, wherein the operations further comprise:

receiving a request for the modified second property data from one of the at least one API, the request comprising the at least one second OData key;

retrieving, in response to the request, the modified second property data based on the at least one second OData key; and transmitting the retrieved modified second property data to the at least one API.

5. The system of claim 1, wherein the operations further comprise:

receiving a request from one of the at least one API, the request comprising the at least one first OData key;

retrieving, in response to the request, all property data of the first entity and all property data of entities related to the first entity based on the at least one first OData key and a corresponding navigation property link, for each one of the entities related to the first entity, linking the first entity to corresponding entity related to the first entity; and transmitting the retrieved property data of the first entity and the retrieved property data of entities related to the first entity to the at least one API.

6. The system of claim 1, wherein the operations further comprise:

receiving a request from one of the at least one API, the request comprising the at least one first OData key;

retrieving, in response to the request, property data of at least one of the first entity and another entity related to the first entity based on the at least one first OData key; and transmitting the retrieved property data to the at least one API.

7. The system of claim 1, wherein the at least one API comprises a plurality of APIs, each one of the plurality of APIs corresponding to a different Web service.

8. The system of claim 1, wherein the at least one API comprises at least one OData API of a Web service.

9. A computer-implemented method comprising:

detecting, by a machine having a memory and at least one processor, a first modification of a first property data of a first entity of a first entity type in a relational database, the first entity having at least one first Open Data Protocol (OData) key comprising first other property data of the first entity distinct from the first property data, the first entity comprising a navigation property link linking the first entity to a second entity of a second entity type, the second entity comprising a second property data absent from the first entity;

generating, by the machine, a first event notification comprising a first indication that the first property data has been modified and the at least one first OData key based on an event structure model in response to the detection of the first modification of the first property data, the first event notification being absent the modified first property data;

transmitting, by the machine, the first event notification to at least one application programming interface (API);

detecting, by the machine, a second modification of the second property data of the second entity, the second entity having at least one second OData key comprising second other property data of the second entity distinct from the second property data;

generating, by the machine, in response to the detection of the second modification of the second property data, a second event notification comprising a second indication that the second property data has been modified and the at least one second OData key based on the event structure model, the second event notification being absent the modified second property data; and transmitting, the machine, the second event notification to the at least one API.

10. The computer-implemented method of claim 9, further comprising:

receiving a request for the modified first property data from one of the at least one API, the request comprising the at least one first OData key;

retrieving the modified first property data based on the at least one first OData key in response to the request; and transmitting the retrieved modified first property data to the at least one API.

11. The computer-implemented method of claim 9, wherein the first entity comprises a navigation property link linking the first entity to a second entity of a second entity type, the second entity comprising a second property data absent from the first entity, and the method further comprises:

receiving a request for the second property data from one of the at least one API, the request comprising the at least one first OData key;

retrieving, in response to the request, the second property data based on the at least one first OData key and the navigation property link; and transmitting the retrieved second property data to the at least one API.

12. The computer-implemented method of claim 9, further comprising:

receiving a request for the modified second property data from one of the at least one API, the request comprising the at least one second OData key;

retrieving, in response to the request, the modified second property data based on the at least one second OData key; and transmitting the retrieved modified second property data to the at least one API.

13. The computer-implemented method of claim 9, wherein the method further comprises:

receiving a request from one of the at least one API, the request comprising the at least one first OData key;

retrieving, in response to the request, all property data of the first entity and all property data of entities related to the first entity based on the at least one first OData key and a corresponding navigation property link, for each one of the entities related to the first entity, linking the first entity to corresponding entity related to the first entity; and transmitting the retrieved property data of the first entity and the retrieved property data of entities related to the first entity to the at least one API.

14. The computer-implemented method of claim 9, wherein the at least one API comprises a plurality of APIs, each one of the plurality of APIs corresponding to a different Web service.

15. The computer-implemented method of claim 9, wherein the at least one API comprises at least one OData API of a Web service.

16. A non-transitory machine-readable storage medium, tangibly embodying a set of instructions that, when executed by at least one processor, causes the at least one processor to perform operations comprising:

detecting a first modification of a first property data of a first entity of a first entity type in a relational database, the first entity having at least one first Open Data Protocol (OData) key comprising first other property data of the first entity distinct from the first property data;

generating a first event notification comprising a first indication that the first property data has been modified and the at least one first OData key based on an event structure model in response to the detection of the first modification of the first property data, the first event notification being absent the modified first property data;

transmitting the first event notification to at least one application programming interface (API);

detecting a second modification of the second property data of the second entity, the second entity having at least one second OData key comprising second other property data of the second entity distinct from the second property data;

generating, in response to the detection of the second modification of the second property data, a second event notification comprising a second indication that the second property data has been modified and the at least one second OData key based on the event structure model, the second event notification being absent the modified second property data; and transmitting the second event notification to the at least one API.

17. The storage medium of claim 16, wherein the operations further comprise:

receiving a request for the modified first property data from one of the at least one API, the request comprising the at least one first OData key;

retrieving the modified first property data based on the at least one first OData key in response to the request; and transmitting the retrieved modified first property data to the at least one API.

18. The storage medium of claim 16, wherein the first entity comprises a navigation property link linking the first entity to a second entity of a second entity type, the second entity comprising a second property data absent from the first entity, and the operations further comprise:

receiving a request for the second property data from one of the at least one API, the request comprising the at least one first OData key;

retrieving, in response to the request, the second property data based on the at least one first OData key and the navigation property link; and transmitting the retrieved second property data to the at least one API.

* * * * *